(12) United States Patent
Zahavi et al.

(10) Patent No.: US 8,886,805 B2
(45) Date of Patent: Nov. 11, 2014

(54) METHOD AND SYSTEM FOR DYNAMICALLY ALLOCATING SERVICES FOR SUBSCRIBERS DATA TRAFFIC

(75) Inventors: Yoram Zahavi, Zichron-Ya'acov (IL); Eyal Pessach, Rishon Le-Zion (IL); Assaf Benedic, Beer-Sheva (IL)

(73) Assignee: Flash Networks, Ltd, Herzliya (IL)

( * ) Notice: Subject to any disclaimer, the term of this patent is extended or adjusted under 35 U.S.C. 154(b) by 471 days.

(21) Appl. No.: 12/946,363

(22) Filed: Nov. 15, 2010

(65) Prior Publication Data
US 2011/0282996 A1    Nov. 17, 2011

Related U.S. Application Data

(60) Provisional application No. 61/262,824, filed on Nov. 19, 2009.

(51) Int. Cl.
*G06F 15/16*    (2006.01)
*H04L 29/06*    (2006.01)

(52) U.S. Cl.
CPC ........ *H04L 65/1063* (2013.01); *H04L 65/1079* (2013.01)
USPC ............................. 709/226; 370/389; 370/310

(58) Field of Classification Search
CPC .................................................... H04W 48/16
USPC ....................................................... 709/226
See application file for complete search history.

(56) References Cited

U.S. PATENT DOCUMENTS

| | | |
|---|---|---|
| 6,252,878 B1 | 6/2001 | Locklear et al. |
| 6,282,575 B1 | 8/2001 | Lin et al. |
| 6,539,029 B1 | 3/2003 | Toivanen |
| 6,687,252 B1* | 2/2004 | Bertrand et al. ............. 370/401 |
| 6,763,018 B1 | 7/2004 | Puthiyandyil et al. |
| 6,954,463 B1 | 10/2005 | Ma et al. |
| 7,286,831 B2 | 10/2007 | Rhee et al. |
| 7,502,339 B1* | 3/2009 | Pirkola et al. ................ 370/310 |
| 7,640,023 B2 | 12/2009 | Ma et al. |
| 7,665,130 B2 | 2/2010 | Johnston et al. |
| 7,761,913 B2 | 7/2010 | Grandmaitre et al. |
| 2002/0087716 A1* | 7/2002 | Mustafa ........................ 709/236 |
| 2003/0027554 A1* | 2/2003 | Haumont ...................... 455/414 |
| 2003/0108174 A1* | 6/2003 | Tucker et al. ............ 379/207.02 |
| 2003/0112793 A1 | 6/2003 | Sengodan |
| 2003/0131132 A1* | 7/2003 | Cheng et al. ................. 709/239 |
| 2004/0037272 A1* | 2/2004 | Park ............................. 370/354 |
| 2004/0081173 A1 | 4/2004 | Feather |

(Continued)

FOREIGN PATENT DOCUMENTS

WO     2009018533 A2    2/2009

*Primary Examiner* — Hamza Algibhah
(74) *Attorney, Agent, or Firm* — Smith Risley Tempel Santos LLC; Gregory Scott Smith

(57) ABSTRACT

Access services are dynamically allocated for processing received data traffic by creating routing information for data traffic associated with a particular subscriber, subscriber equipment and/or network address information. The routing information identifies services that the data traffic can be subjected to and the order in which the services are provided. When an attached request is received, appropriate services for the requesting subscriber are retrieved from a database based on particular identifying information which may include the identification of the subscriber, subscriber equipment, network address or other information. The services are organized in a routing path and the allocated network address and the routing path are transferred to a smart router. Data traffic, associated with the allocated network address is then routed through servers to provide the identified services.

12 Claims, 4 Drawing Sheets

(56) References Cited

U.S. PATENT DOCUMENTS

| | | |
|---|---|---|
| 2004/0153525 A1* | 8/2004 | Borella .................. 709/217 |
| 2005/0113114 A1* | 5/2005 | Asthana ................ 455/456.3 |
| 2005/0163131 A1* | 7/2005 | Tonnby et al. .......... 370/395.53 |
| 2005/0190775 A1* | 9/2005 | Tonnby et al. ............. 370/401 |
| 2005/0249194 A1* | 11/2005 | Sahaya et al. ............. 370/352 |
| 2006/0013157 A1* | 1/2006 | Annic ...................... 370/328 |
| 2006/0161639 A1* | 7/2006 | Kato ........................ 709/219 |
| 2006/0168303 A1 | 7/2006 | Oyama et al. |
| 2006/0187883 A1* | 8/2006 | Abrol et al. ............. 370/331 |
| 2007/0091843 A1* | 4/2007 | Patel et al. ............. 370/331 |
| 2007/0104205 A1* | 5/2007 | Baik ..................... 370/395.3 |
| 2007/0110060 A1* | 5/2007 | Miki et al. ............... 370/389 |
| 2007/0168475 A1* | 7/2007 | Mullahy et al. .......... 709/220 |
| 2007/0297400 A1 | 12/2007 | Cameron et al. |
| 2008/0117958 A1* | 5/2008 | Pattenden et al. ......... 375/222 |
| 2008/0132207 A1* | 6/2008 | Gallagher et al. ......... 455/411 |
| 2008/0181208 A1* | 7/2008 | Maes ....................... 370/389 |
| 2008/0271159 A1 | 10/2008 | Brown et al. |
| 2008/0276305 A1 | 11/2008 | Chan et al. |
| 2008/0285492 A1 | 11/2008 | Vesterinen |
| 2008/0294755 A1* | 11/2008 | Melsen et al. ............. 709/220 |
| 2009/0016344 A1* | 1/2009 | Hu et al. .................. 370/389 |
| 2009/0047947 A1 | 2/2009 | Giaretta et al. |
| 2009/0059818 A1* | 3/2009 | Pickett .................... 370/259 |
| 2009/0129371 A1* | 5/2009 | Bishay ..................... 370/352 |
| 2009/0196184 A1* | 8/2009 | Rajan et al. ............... 370/238 |
| 2010/0034181 A1* | 2/2010 | Shinozaki .................. 370/338 |
| 2010/0105385 A1* | 4/2010 | Tanabe et al. ............. 455/435.1 |
| 2010/0142369 A1* | 6/2010 | Gottwerth et al. .......... 370/225 |
| 2010/0145814 A1* | 6/2010 | Meghani et al. ............. 705/26 |
| 2010/0202351 A1* | 8/2010 | Xi et al. .................. 370/328 |
| 2010/0246587 A1* | 9/2010 | Schutz et al. .............. 370/401 |
| 2011/0078163 A1* | 3/2011 | Veres et al. ............... 707/754 |
| 2012/0046058 A1* | 2/2012 | Vesterinen et al. .......... 455/509 |
| 2012/0057576 A1* | 3/2012 | Neil et al. ................ 370/338 |
| 2012/0220259 A1* | 8/2012 | Sennett et al. ............ 455/404.2 |
| 2013/0250768 A1* | 9/2013 | Raleigh .................... 370/235 |

* cited by examiner

METHOD AND SYSTEM FOR DYNAMICALLY ALLOCATING SERVICES FOR SUBSCRIBERS DATA TRAFFIC

CROSS-REFERENCE TO RELATED APPLICATIONS

This application is a non-provisional application being filed under 35 USC 111 and 37 CFR 1.53(b) and claims the benefit under 35 USC 119(e) of the benefit of the prior filing date of the U.S. Provisional Application for patent that was filed on Nov. 19, 2009 and assigned Ser. No. 61/262,824, which provisional is hereby incorporated by reference in its entirety.

FIELD OF THE DISCLOSURE

The present disclosure relates to the field of data communication over a packet switch network, and more particularly to service allocation for subscriber's data traffic.

BACKGROUND

Today, more and more access-network operators (ANO) deliver personalized access services in addition to general access services. Exemplary personalized services at an access point can include: spam filtering, antivirus services, filtering access to certain content servers, control access to different restricted IP networks, data optimization, etc. A subscriber of such a network can purchase one or more sets of the personalized services. Consequently, to deliver a personalized set of access services to a certain subscriber, a complex system and method configuration is needed. The necessity for the complex system and method configuration is at least partly due to the variety type of services, subscribers, demands or preferences of subscribers, types of subscriber equipment (SE), etc. When subscribers have access to multiple services and/or to different restricted IP networks with a variety of types of SE, the network configuration becomes complex.

The network system and method becomes even more complex when an ANO (access-network operator) offers on-line purchasing of services, features, etc., or on-line changing of the personalized set of access services by using a "Call-Center" or a "Self-Care" web-site, for example. An exemplary Call-Center or Self-Care server can enable a subscriber to modify his/her personal set of access services, thus forcing a change in the SE configuration and/or network configuration. Managing, supporting and provisioning of such changes can result in higher costs for providing service, provisioning and management of frequent updates, troubleshooting and technical support for subscribers. Furthermore, such support and flexibility can be considerably time consuming and result in significant administration cost, etc.

Exemplary access network operators can be: a cellular operator, a cable TV operator, a Public Land Mobile Network (PLMN) operator, a Public Switched Telephone Network (PSTN) operator, etc. Throughout the disclosure, the above-listed types of access-networks may be used interchangeably and the cellular network can be used as a representative example of an access network. Exemplary SE (subscriber equipment) can be: mobile telephones, cellular telephones, smart phones, such as but not limited to IPHONE (a trademark of Apple computers Inc), PDA's (Personal Digital Assistants), laptops, notebooks, personal computers, or other computing device with communication capabilities. In the disclosure, the above-listed types of SE may be used interchangeably and the term mobile telephones can be used as a representative example of a generic type of SE.

In a common cellular packet switched network, such as a General Packet Radio Service (GPRS) network, a Gateway GPRS Support Node (GGSN) can act as a gateway between the GPRS network and an Internet Protocol (IP) network. When a subscriber located in the GPRS network wishes to have wireless attachment, connectivity or otherwise communicative coupling to a data network, such as but not limited to, an IP network, the Gateway GPRS Support Node (GGSN) can be the gateway for translating between protocols used over the two networks. The term attachment, communicatively coupled, connected, connectivity, or the like refer to the ability for two devices, systems or elements to share communications and may or may not include a physical and/or dedicated connection and, the term attachment may be used throughout to generically described a communication path between two devices, systems, etc.

When a subscriber wishes to establish an IP session, his/her SE transmits a data session activation message toward an access server at a cellular access-network operator (ANO), for example. The data session activation message is used to attach or communicatively connect or couple an SE to a cellular access network. An exemplary access server can be a Serving GPRS Support Node (SGSN). An exemplary Internet session activation message can include a subscriber ID, such as an International Mobile Subscriber Identity (IMSI) or a Mobile Station International Subscriber Directory Number (MSISDN), and information on the SE capabilities, etc. The SGSN can be the gateway for allowing or denying access (attachment).

Typical methods that are commonly used for allocating access services can include authenticating the SE based on a subscriber name and a password, for example. However, such a method can result in configuration problems and require a subscriber to take certain actions, such as configuring their own SE. Requiring the user to take such actions can be time consuming and in some situations, the subscriber may simply not be sophisticated enough to take such actions.

Another typical method that is used today for providing different sets of access services to different subscribers utilizes an access-point name (APN). In such techniques, each subscriber is provided with an APN from an operator. The APN reflects or is associated with a set of access services that the subscriber can receive or is authorized to utilize. In such access networks, an attachment message will typically include the subscriber's APN number.

After validating, the subscriber's rights or authorizations, such as is typically accomplished by employing the use of a Home Location Register (HLR) and/or an Authentication Authorization and Accounting server (AAA), a public IP address for accessing the Internet is allocated to the SE. The allocated public IP address is then used during the current session. A typical ANO has a pool of public IP addresses that can be allocated. The pool of public IP addresses can be divided into groups of public IP addresses and each group can be associated with a set of access services to be executed on a data communication session. Some ANO may allocate a private IP address to an incoming packet. The private IP address can be allocated based on an associate APN. When the packet leaves the access network the private IP address is replaced with a public IP address based by a network address translation (NAT), for example.

To deliver the large variety of sets of services to appropriate subscribers who purchase those sets, an exemplary access network operator can utilize one or more routers. The routers operate to intercept the data traffic between the subscribers and the external network, such as the Internet or some other network, and then route the packets to the appropriate set of services according to the set of services that the subscriber is entitled to use or access. As an example, a router can be configured to route packets from a subscriber to the Internet, and vice versa, via a certain set of services based at least in part on the public IP address utilized in the transmitted packets and the type of the application of the session. A few non-limiting examples of routers that can be utilized include the Service Control Engine (SCE) product line manufactured by CISCO, or Content Inspection Director (CID) product line manufactured by RADWARE or the BIG-IP manufactured by F5, etc. Alternatively, or in addition, a chain of routers can be used with each router being located at the egress of a service, and configured to route the data packets toward a next service according to public IP address associated with the data packets and a routing table. Consequently, a multiple routers/equipment is needed to supply the various services for each APN.

As the technology quickly advances, new personal services are created. Several complications are encountered during typical operations because new personal services are frequently added. When new services are added, the operator needs to be frequently updated regarding the new services. In addition, routing tables associating the public IP addresses and the set of access services need to be updated with the new services and changes the groups of IP addresses also need to be updated. The relationship between the numbers of sets of services for each new added service is a permutation relation not a linear relation, thus the up-dating process is a long and complicated effort.

Furthermore, this method is limited to a certain number of combinations of services because the pool of public IP addresses of the ANO is limited. Because the number of public IP address in each group is limited, the number of subscribers with similar access services and similar APN that can be served simultaneously is also limited. Furthermore, changing the access services that a subscriber can purchase and/or changing the personalized set of services and/or the SE can also require changing the configuration of the routers and/or changing the APN at the SEs and/or the groups in the pool of the public IP addresses.

BRIEF SUMMARY

We found, there is a need in the art for a technique that can enable a subscriber to update his/her requested personal services, and dynamically supply those services when the subscriber sets an attachment to a data network. Further, there is a need for such a technique to be simple or uncomplicated. Further, there is a need for such technique to not be limited to the current techniques available. Yet further, there is a need in the art for a solution that will prevent the limitation on the number of subscribers with similar sets of access services that can be served simultaneously. These and other needs in the art are uniquely satisfied by the various embodiments described within this specification.

Exemplary embodiments of a dynamic service allocator that are presented in the present disclosure provide novel systems and employ novel methods for solving the above-described needs in the art. In general, for each request received from a subscriber, such as a request to attach (access) to a data network (i.e, the Internet or any public or private network), various embodiments of the dynamic service allocator may operate to collect information on the latest personalized set of access services to which the subscriber is entitled. Because the information for various embodiments of the dynamic service allocator is on a subscriber-basis rather than a fix-set-services-basis (groups of APN), there is no need to reallocate the subscribers' public IP address from a specific limited group of public IP address numbers. Thus, the subscriber can receive a random IP public address number from the entire pool of public IP addresses that are available to the ANO. Some ANO may allocate a private IP address to an incoming packet. The private IP address can be allocated based on an associate APN. When the packet leaves the access network the private IP address is replaced with a public IP address based on a network address translation (NAT), for example.

Based on the latest or current information pertaining to the subscriber, various embodiments of the dynamic service allocator can instruct a novel smart router as to which access services to route the data traffic. An exemplary smart router can operate to intercept the data traffic between the subscriber and the Internet. Such a smart router may be installed in an access network between an access gateway and a border gateway. As a non-limiting example within a cellular access network, an access gateway can include an SGSN followed by a GGSN, and the border gateway can be a common IP router. In some embodiments the border gateway may include NAT functionality.

In an exemplary embodiment of the dynamic service allocator can be installed at an access network between a subscriber and the Internet at an ANO premises (ANOP). In such an example, the ANO can be a telecom operator, such as but not limited to: a cellular operator, a satellite communication service provider, a Public Switched Telephone Network (PSTN) operator, etc. Other exemplary embodiments of the dynamic service allocator can be installed at an Internet Service Provider (ISP) premises, etc.

An exemplary dynamic service allocator can include, but is not limited to, a service-orchestration server (SOS) and a smart router that has been configured to accept and process routing instructions received from the SOS. Based on the routing instruction, the smart router can update a routing table with regards to which services (ports) to route packets received from a relevant subscriber. In addition to its common operation, an exemplary ANOP can be adapted to respond to a request to attach to a data network. For example, if the ANOP receives an attachment request from a subscriber at an access gateway (service gateway), the ANOP can inform the SOS about the requested new data session. An exemplary access gateway can be an SGSN. The access gateway can deliver information about the subscriber to the SOS. The delivered information may include the subscriber's ID, such as an International Mobile Subscriber Identity (IMSI) or a Mobile Station International Subscriber Directory Number (MSISDN), etc. The information can further include an allocated random public IP address for that subscriber that is selected from a pool of public IP addresses of the ANOP. The allocated public IP address can be one selected from the entire pool of public IP addresses of the ANO rather than having to be restricted to a group of IP addresses within the pool of IP addresses recognized or associated with certain services. In some embodiments, as mentioned above, a private IP address can be used in the access network.

Upon receiving the indication of the establishment the new session from the SGSN, the SOS can collect information about the access services that the requesting subscriber is entitled to access or utilize. The access service information can be collected by the SOS from different resources, such as an AAA server, HLR (Home location register) server, self-care server, ANO's databases, etc. The SOS can find and locate the access service information for the subscriber using various searching techniques, such as searching on the subscribers' ID. In some embodiments, the different resources of the access service information can be configured to update an access-services database with the latest information on the access services a subscriber is entitled or authorized to access or utilize. The subscriber's ID, as well as additional or alternative information (i.e, the identification information can be a subscriber ID, SE identification information, or any of a variety of information), can be used as an index to the access-services database. It should be noted that the terms "databases", "database" and "access-services database" are used interchangeably herein and represent one or more databases in the ANOP that contains information on the latest access services a subscriber is entitle to and are organized according to the subscriber's ID.

The collected access service information for the subscriber can be processed and a routing path can be prepared, created or obtained from a database of routing paths based at least in part on the access service information. The routing path, among other things, can define which of the smart router ports are to be used for the subscriber data traffic (for instance, defining a list of access services through which the data packets may be passed). The routing path can be translated to an API (application program interface) according to the API of the utilized by the router, a generic API that can later be converted or, a proprietary format and custom routers may be used or off-the-shelf routers may be modified to be compatible with the proprietary format. In accordance with the routing path, the data traffic of the subscriber can be passed through one access service, returned to the smart router, passed to the next access service, returned to the smart router, and so on.

The routing path can be sent to the smart router together with the subscriber allocated public IP address. Based at least in part on the received information, including the routing path and the subscriber allocated public IP address, the smart router can update the routing table using the allocated public IP address as an index, for example. Thus, in an exemplary embodiment, the routing information is for the particular subscriber for the current access session. In such an embodiment, an explicit personal set of services are given that particular subscriber according to current public IP address allocated for that particular subscriber.

Upon receiving data packets that are sent between any such subscribers and the Internet, the smart router, based at least in part on the allocated public IP address (with or without the port number) of the packet, operates to search the routing table and, according to the routing plan for that current allocated public IP address (current subscriber), the smart router routes the packet directly toward its destination (the Internet or the subscriber) or through the one or more purchased access services.

Various embodiments of the dynamic service allocator can enable dynamic-decision making regarding which access services to grant to each subscriber. Exemplary dynamic-decision making can be based on different real-time variables. As non-limiting examples, the real-time variables can include one or more of: the time of day, the location, the load, the BW consumption, the type of subscriber equipment, the surfing history of the subscriber, and so on. Utilizing such a feature, the SOS can check each subscriber request and other external parameters before automatically routing to a certain access service. If according to the specific request and the external parameter there is no need to route the traffic through a certain access service, then the SOS can decide to skip that service. For example, if the subscriber is entitled to receive content filtering, such as porn sites, the SOS route utilize the filter service to prevent a subscriber or someone utilize the subscriber's SE from having access to such content. As another example, based on the current time (i.e., late at night), the SOS may assume that that an adult is surfing the web and not a child, and thus, the SOS can decide not to route the request through content filtering service. Real-time location of the subscriber can also be used for determining which access service to offer (certain news, local advertisement, for example), and so on. Advantageously, such a feature can result in a cost saving as some access services charge a fee. Thus, if certain traffic does not require a particular service, even though the subscriber is entitled to that service, the operator or SOS can decide to deny that service and to save cost and time.

In yet another exemplary embodiment, the novel SOS can instruct the smart router to route traffic through default-access services that all subscribers' data traffic can automatically pass through. The default-access services can be used if there is no information regarding the subscriber's rights. In some other exemplary embodiments, a packet can first be transferred to a deep packet inspection server (DPI). Such a DPI can inform the SOS with regards to parameters that can be used during a data session. For example, a typical parameter can be a URL of a certain request. According to information received from the DPI, the SOS can update the routing instructions. Consequently, embodiments of the dynamic service allocator can dynamically update the routing instructions between the different access services that a subscriber may utilize.

Another advantage of exemplary embodiments of the dynamic service allocator is the elimination of the need for splitting the ANO's pool of public IP addresses into a plurality of groups, where each group is associated with a certain set of access services. Simplifying the management efforts required for handling a variety of groups of public IP addresses helps to improve the flexibility in allocating a large number of similar services simultaneously. This advantage is realized by the fact that the entire pool can be used for a single set of services instead of a single group. Furthermore, various embodiments of the dynamic service allocator operate to alleviate the need for complicated and frequent configuring, calculation and updating of different entities that are involved in allocating access services. For example, entities such as chains of routers, SEs, SGSM server, etc. Embodiments of the dynamic service allocator can broaden the capabilities of the operator, enabling the operator to make dynamic-decision that will improve the systems' overall performance, results, and improve the subscriber experience.

Another advantageous feature that can be included in various embodiments of the dynamic service allocator is that the number or routers required to process the data traffic of a subscriber can be reduced. For instance, various embodiments of the dynamic service allocator may operate by routing the data traffic of the subscriber, in accordance with the routing path (received from SOS, by passing the data traffic through one purchased access service, which is then returned to the smart router, then passing the data traffic to the next purchased service, which also returns to data traffic to the smart router, and so on. This process can be repeated until the last purchased service has processed the data traffic and then, the data traffic is passed to the Internet/Intranet. Thus, this method reduces the number of routers needed for passing a subscriber data traffic when the data traffic requires multiple access services. In addition, the capability of the SOS to control the allocation of the access services per each user may save resources of certain services that a certain user is not interesting to get.

The foregoing summary is not intended to summarize each potential embodiment or every aspect or feature of the various embodiments of the dynamic service allocator, and other features and advantages will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the embodiments with the accompanying drawings and appended claims.

BRIEF DESCRIPTION OF THE SEVERAL VIEWS OF THE DRAWING

Exemplary embodiments of the present disclosure will be understood and appreciated more fully from the following detailed description, taken in conjunction with the drawings in which.

DETAILED DESCRIPTION OF EMBODIMENTS

Turning now to the figures in which like numerals represent like elements throughout the several views, various embodiments of disclosure dynamic service allocator are described. For convenience, only some elements of the same group may be labeled with numerals. The purpose of the drawings is to describe exemplary embodiments and not for production. Therefore features shown in the figures are chosen for convenience and clarity of presentation only.

Figure 1:
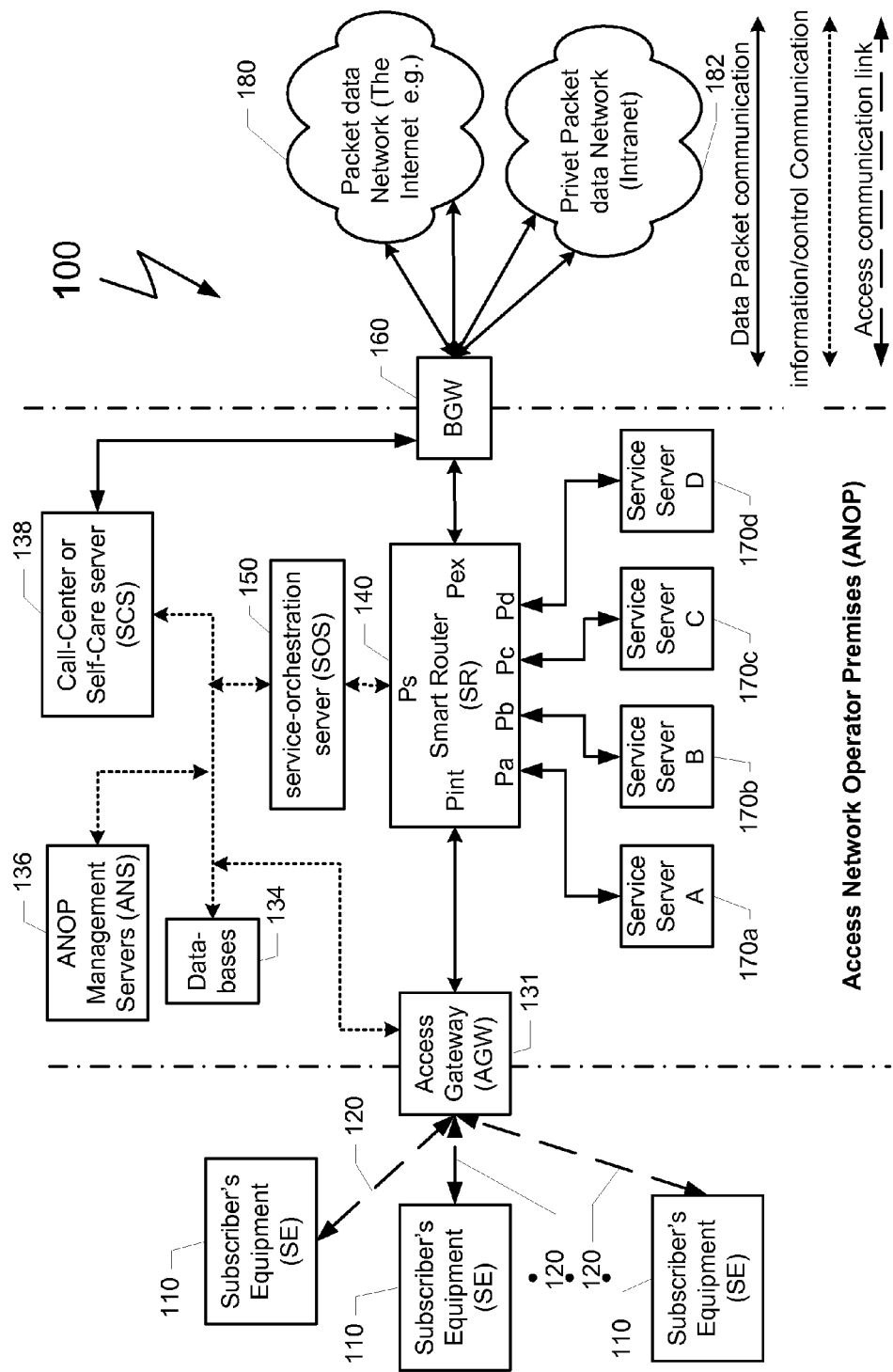
FIG. 1 is a block diagram illustrating relevant elements of an exemplary communication system in which an exemplary embodiment of the dynamic service allocator can be implemented.

FIG. 1 is a block diagram illustrating relevant elements of an exemplary communication system in which an exemplary embodiment of the dynamic service allocator can be implemented. FIG. 1 depicts a system 100 which may include, but is not limited to nor required to include, an Access Network Operator Premises (ANOP). The Access Network Operator (ANO) for which the various embodiments may be deployed can be any of a wide variety of ANOs, including but not limited to, a cellular operator, telecom operator, Internet provider, a satellite communication service provider, a Public Switched Telephone Network (PSTN) operator, as well as others and combinations or hybrids of two or more such ANOs. Other exemplary embodiments of the dynamic service allocator can be deployed within or operate within an Internet Service Provider (ISP) premises, etc.

An ANOP can provide different access services to a plurality of different types of subscriber equipment (SE) 110. Non-limiting examples of a few types of SE can include: laptop computers, mobile telephones, PDA (personal digital assistance), computers, etc. To further illustrate various embodiments of the dynamic service allocator, a few not-limiting examples of typical access services 170a-d may include: Spam filtering, content filtering, bandwidth consumption distribution, etc. A typical ANOP can operate to identify a plurality of subscribers and the subscriber equipment (SE) 110 utilized by such subscribers at its ingress by an Access gateway 131 (AGW) for example. Non-limiting examples of such an Access gateway 131 include a Serving GPRS Support Node (SGSN) with a Gateway GPRS Support Node (GGSN) operating in a typical GSM network, a PDSN and a Home-Agent operating in a CDMA network, etc. An exemplary ANOP can operate to: identify the services a subscriber is entitled to utilize or access; route data traffic of the subscriber through the appropriate services; and output the served traffic through a border gateway (BGW) 160, for example.

Each subscriber can be connected to the AGW 131 through different communication links 120. The communication links 120 in various environments may include, but are not limited to: wireless links, wired links, ADSL links, cellular links, etc. An ANOP may also include border gateway (BGW) 160 at the interface to a network. The BGW 160 can be a common Internet Protocol (IP) router, for example. In some embodiments, BGW 160 may comprise NAT functionality.

In some exemplary embodiments of the dynamic service allocator (not shown in the drawings) the communication links 120 can be based on an IP network. In such embodiments, the communication links can be connected directly to an IP gateway that can be included in the AGW 131 or exist separate from the AGW 131. For example, when the ANOP is a GSM network, the AGW 131 can include an SGSN and a GGSN. In such environments, the links 120 can be connected directly to the GGSN.

The BGW 160 can be connected to a plurality of packet data networks 180, such as, but not limited to: the Internet, or other global or wide area network. The BGW 160 can also be connected to private packet data networks 182 such as, but not limited to: an Intranet, a private local area networks (LANs), etc. The communication between the BGW 160 and the packet data network 180 and/or private packet data network 182 can be data packet communication based on IP. The communication links between the subscribers 110 and the AGW can be access communication links based on the packet data protocol (PDP), for example.

The ANOP can further comprise a packet data network, which can receive data packet communication from subscribers 110 through the AGW 131. Exemplary packet data networks can include a portion of the AGW 131. A smart router (SR) 140 operating in conjunction with the ANOP can intercept and route the packet data traffic between the AGW 131 and the BGW 160 using one or more access services. The SR 140 may be communicatively coupled to one or more service servers 170a-170d through one or more ports Pa-Pd. The SR 140 can route IP packets, which it receives at its ingress port (Pint) from the AGW 131, for example, to one or more of the different service servers 170a-d communicatively coupled to the SR 140 through one or more of ports Pa-d. The service servers may operate to provide access services such as, but not limited to: deep packet inspection (DPI), virus detection, Spam rejection, authentication, content filtering, data compression, etc. Based on routing instructions received from a Service-Orchestration Server (SOS) 150, the SR 140 can route a data packet through an appropriate set of services. The routing plan between the access services and the order of invocation of the access services can be determined, at least in part, on the public IP address that has been allocated to the subscriber for the data access session. The served data packet traffic, once processed, can be output (via port Pex) from the Smart router 140 toward the BGW 160.

Data packet communication arriving from the packet data networks 180 and/or private packet data networks 182 and directed toward a subscriber 110 can pass through the BGW 160 toward the SR 140. The access services that the data packets will be subjected to by the SR 140 can be similar to the access services invoked for the data packets that the subscriber 110 sent, but the service may be invoked in a different order, such as in the opposite order, for example. Therefore the SR 140 can search for the public IP address in the destination address fields of the header of the packet and route the data packets according to a routing plan associated with the public IP address.

The SOS 150 and the AGW 131 can be assisted by, or query and/or otherwise utilize one or more databases 134, an ANOP management server 136 (ANS), and a Call-Center or Self-Care server 138. The ANOP management servers 136 (ANS) can be one or more servers, such as but not limited to, a home location register (HLR) in a cellular ANO, a Policy & Charging Rule Function (PCRF) server, and/or an Authentication, Authorization, Accounting (AAA) server, for example. The databases can include information on the different subscribers 110, on the types of subscriber equipment, information on the access services that each subscriber is entitle to access or utilize, subscriber preferences, etc. The ANOP management server 136 (ANS) can be responsible for: authenticating subscribers, authorizing their access to the network, processing billing issues, etc.

A subscriber can purchase through the Call-Center or Self-Care server 138, different access services. The Call-Center or Self-Care server 138 can update the databases 134 with the latest information on the access services that a subscriber is entitle to utilize. The updated database 134 can be used by the SOS 150 for determining through which access services the data traffic of a subscriber 110 needs to or may be routed. Internal control and information communication can be transferred between the different units in the ANOP. The control and information communication (represented as doted arrows in the drawing) can be transferred via one or more LANs using protocols such as, but not limited to, RADIUS, GX, etc., for example. More details on the operation and configuration of the SR 140 and the SOS 150 are disclosed below in conjunction with the description of FIG. 2, FIG. 3 and FIG. 4.

In some embodiments, the different resources of information, such as the ANS 136 and the SCS 138 can be configured to update a centralized access-services database 134 with the latest information on the access services a subscriber is entitle to utilize. The subscriber's ID, as well as additional or alternative information, can be used as an index to the access-services database. It should be noted that the terms "databases", "database" and "access-services database" are used interchangeably herein and represent one or more databases and sources for information in the ANOP that contains information on the latest access services a subscriber is entitled to and are organized according to the subscriber's ID or other key. In addition, the database may be external to the ANOP and accessed when needed in either a push or pull manner.

An exemplary Call-Center or Self-Care server 138 can enable a subscriber to modify his/her personal set of access services. For example, a subscriber can access the Call-Center or Self-Care server 138 through an audio telephone, a browser interface, etc. A subscriber can be identified by a user name and password, for example. An operator (human or machine) at the SCS 138 can communicate or interact with the subscriber. In some embodiments, a self-care server can communicate with a subscriber through the BGW 160. The BGW 160 can route to SCS 138, IP data packets coming from the external networks 180 and 182 or from the SE 110 and having the IP address of SCS 138 as their destination IP address. For instance, such packets may relate to updating interactions of the services which the subscriber wishes to purchase or to change and accordingly, the SCS 138 can operate to update the DB 134. The SCS 138 destined packets may be generated by a program or system provided to allow the subscriber to modify, change, add and/or delete access services or, may be generated by other systems that automatically operate to modify, change, add and/or delete services based on the interaction with the subscriber. For instance, if the subscriber is utilizing INTERNET EXPLORER to access certain content, the SE may send particular configuration information to the SCS 138, whereas if the subscriber is using an email program, different configuration information may be sent to the SCS 138. In some embodiments SOS 150 may apply to SR 140 for collecting information on a certain user. The information can include the bandwidth consumption of the user during the last session, the time in the day that the user accesses the Internet, etc. The SOS 150 may store the collected information in DB 134, for example.

Figure 2:
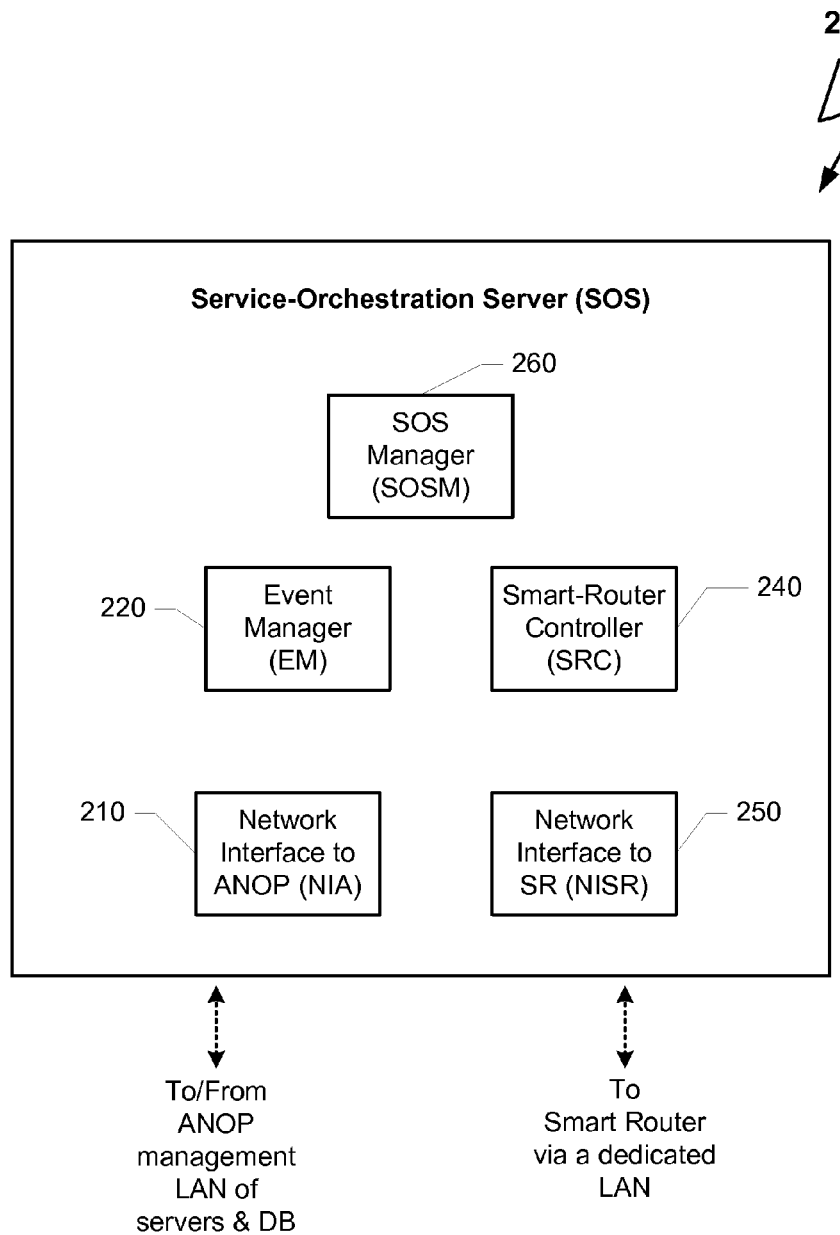
FIG. 2 is a block diagram illustrating relevant elements of an exemplary Service-Orchestration server (SOS)

FIG. 2 is a block diagram illustrating relevant elements of an exemplary Service-Orchestration server (SOS) 200. The SOS 200 can be communicatively coupled, via a LAN or other means, to the AGW 131 (FIG. 1), to the databases 134 (FIG. 1), and/or to the ANS 136, for example. The SOS 200 can also be communicatively coupled to the smart router 140 (FIG. 1), via the same LAN or a dedicated communication path, for example. In an alternate embodiment, there can be other types of networks that can communicatively couple the SOS 200 to the ANOP (FIG. 1) and its internal units. A network interface to ANOP (NIA) 210 can act as an interface between the internal units of the SOS 200 and the AGW 131, the ANS 136 and databases 134 (FIG. 1) of an ANOP, for example. An exemplary NIA 210 can receive messages pertaining to different events, via the internal LAN. The messages can be sent from the AGW 131 (FIG. 1) to the different servers of ANOP, such as the AGW 131, the ANS 136, and the SOS 150 (FIG. 1). Exemplary events can be a subscriber request to attach to the data packet network or a subscriber request to detach from the same. The event messages can be transferred using different protocols depending on the communication used over the internal ANOP LAN that connects the internal servers of the ANOP. Non-limiting examples of such protocols can be RADIUS, DIAMETER, etc. The NIA 210 can be configured to process the received messages and update an event manager (EM) 220 with regards to the received events. The events can be stored in a queue that is associated with the EM 220, a FIFO (first in first out), stack, or prioritized queue for example. The EM 220 can orderly handle each event from the queue, by parsing the event message to retrieving relevant information, such as the subscriber ID, the allocated public IP address and an indication on the type of the event, such as attach, detach, etc. The parsed information can be stored in the queue, at the ingress of a smart-router controller (SRC) 240.

An exemplary network interface to the SR (NISR) 250 can act as an interface between the SR 140 (FIG. 1) and the internal units of the SOS 200, for example. The communicative coupling to the SR 140 can be via a LAN, for example. The NISR 250 can obtain routing instructions from the SRC 240. The routing instruction can include or identify one or more access services 170a-d and the invocation order for these access services. The instructions can be received via a queue, a FIFO, stack, prioritized queue, etc. The NISR 250 can translate, if necessary, the routing instructions to comply with an API used between the SOS 200 and the SR 140. An exemplary API can define the fields in which the allocated public IP address is written; a field which indicates the type of the event (attach or detach); fields for the access services according to the order, through which the packets having the relevant public IP address will be transferred; etc. The NISR 250 can also receive and transfer commands such as, but not limited to, initiating the current SR 140 routing table, etc.

The SOS 200 can further include an SOS manager (SOSM) 260, for example. The SOSM 260 can control the internal units of the SOS 200. The SOSM 260 can initiate the SOS 200 internal units upon power on the SOS 200. The SOSM 260 can allocate and introduce different units (internal and external units) and resources important to the SOS 200 function upon power up, and so on. The SOSM 260 can be a processor that can communicate with the different servers in the ANOP (FIG. 1). In some embodiments SOSM 260, at the end of each event, may apply to SR 140 via NISR 250 for collecting information on the certain event. The information can include the user ID, bandwidth consumption of the user during the last event, the time in the day, etc. The SOSM 260 may transfer the collected information to DB 134 (FIG. 1) via NIA 210, for example For each attach event, the smart-router controller (SRC) 240 can be responsible for planning a routing path for any of the packets associated with the public IP address which is mentioned or otherwise identified or associated with the attach event. The routing path defines the different service servers 170a-d (FIG. 1) and the order through which the SR 140 will transfer the received packets from/to the SE 110 to/from the data packet network 180 or 182. Based on the subscriber ID (or other key), the SRC 240 can access the database 134 (FIG. 1) via NIA 210 and fetch an entry that is associated with the ID. Information can also be collected from the ANS 136 (FIG. 1). The SRC 240 can then operate to parse the information stored in the entry and determine the relevant services to which the subscriber is entitle to utilize or access. The subscriber ID or other key can be or include portions or all of the International Mobile Subscriber Identity (IMSI), a Mobile Station International Subscriber Directory Number (MSISDN), and/or other information for example. In some embodiments, rather than employing an NISR 250, the SRC 240 can include an API (application program interface) for translating the routing instruction according to the API used with that the particular SR 140. The SRC 240 forwards the routing path information to the SR 140 through the NISR 250, for example.

In some embodiments, additional information can be fetched by the SOSM 260 and be used by the SRC 240 in order to define the current access services to be used. The additional information can be real time information such as, but not limited to: the current load over the ANOP, the current time-of-day, the location of the subscriber equipment, surfing-history of the subscriber, the user ID of the subscriber using the SE (i.e., when the SE is utilized my multiple users) and so on. Based at least in part on the information found on the subscriber in the database 134 and the real time information, the SRC 240 can plan a routing path for the data packets begin sent from or to the SE. The SR 140 can save the received routing instructions in a routing table. Each entry in the routing table can be associated with a current allocated public IP address—a current allocated public IP address and additional information may also be used. In some embodiments, when a routing path is changed due to real-time conditions, such as but not limited to load, then a report may be sent to ANS 136 and/or stored in DB 134.

A detach event can be converted by the SRC 240 according to the API used by the SR 140 into a detach instruction that includes the allocated public IP address and the detach indication. The detach routing instruction can be transferred via the NISR 250 to the SR 140, which in its turn operates to delete the entries in the routing table that are associated with the allocated public IP address. In some embodiment a detach event may lead to creating a report on the certain event.

After updating its routing table, the SR 140 can be configured to parse the network layer of data packets sent from the SE 110 to the Packet data networks 180 or Private data networks 182. Based at least in part on the source IP address of the received packet (or other relevant information depending on the particular implementation), a relevant entry in the routing table is searched and the packet is transferred via one or more access services 170a-d by the SR 140. After transferring the packets via the relevant access services 170a-d, the packets are transferred toward the external networks 180/182 (FIG. 1). For data traffic traveling in the opposite direction, the SR 140 parses the network layer of data packets received from the external networks 180 or 182. Based at least in part on the IP destination address (or other relevant information depending on the particular implementation). the SR 140 identifies the relevant entry in the routing table for the data packet. The received data packet can be routed through similar access services as the data packet received from that subscriber would pass but possibly in a different order (i.e., the opposite order). Thus, a single entry in the database can be used to store the routing information for data traffic in both directions and, the order of the routing information modified simply based on the direction of the data traffic, or other information such as the time-of-day, the user ID, etc.

In an alternate embodiment, the SRC 240 can act as the SOS manager 260. In such an embodiment, there is no need for a separate unit SOSM 260 as the SOSM 260 can be implemented as part of the SRC 240. Yet in another exemplary embodiment, the SOS 200 can further include an SOS-attached table (SAT) (not shown on drawing). The SAT can be updated with relevant information for each new attached subscriber. Each entry in the SAT can be associated with a subscriber according to his/her ID (or other information about the subscriber or otherwise), and the allocated IP address, and so on. The SAT can also be updated each time a subscriber is detached, and the relevant information on that subscriber can be either deleted or saved. Periodically the SAT can be searched and checked to determine if there are any sessions that were requested to be detached but were not, and so on. Other exemplary embodiments of the SOS 200 can further or alternatively include a confirmation entity that can validate each IP public address if no other subscriber is already using that IP public address, and inform the SRC 240 accordingly, for example.

Figure 3:
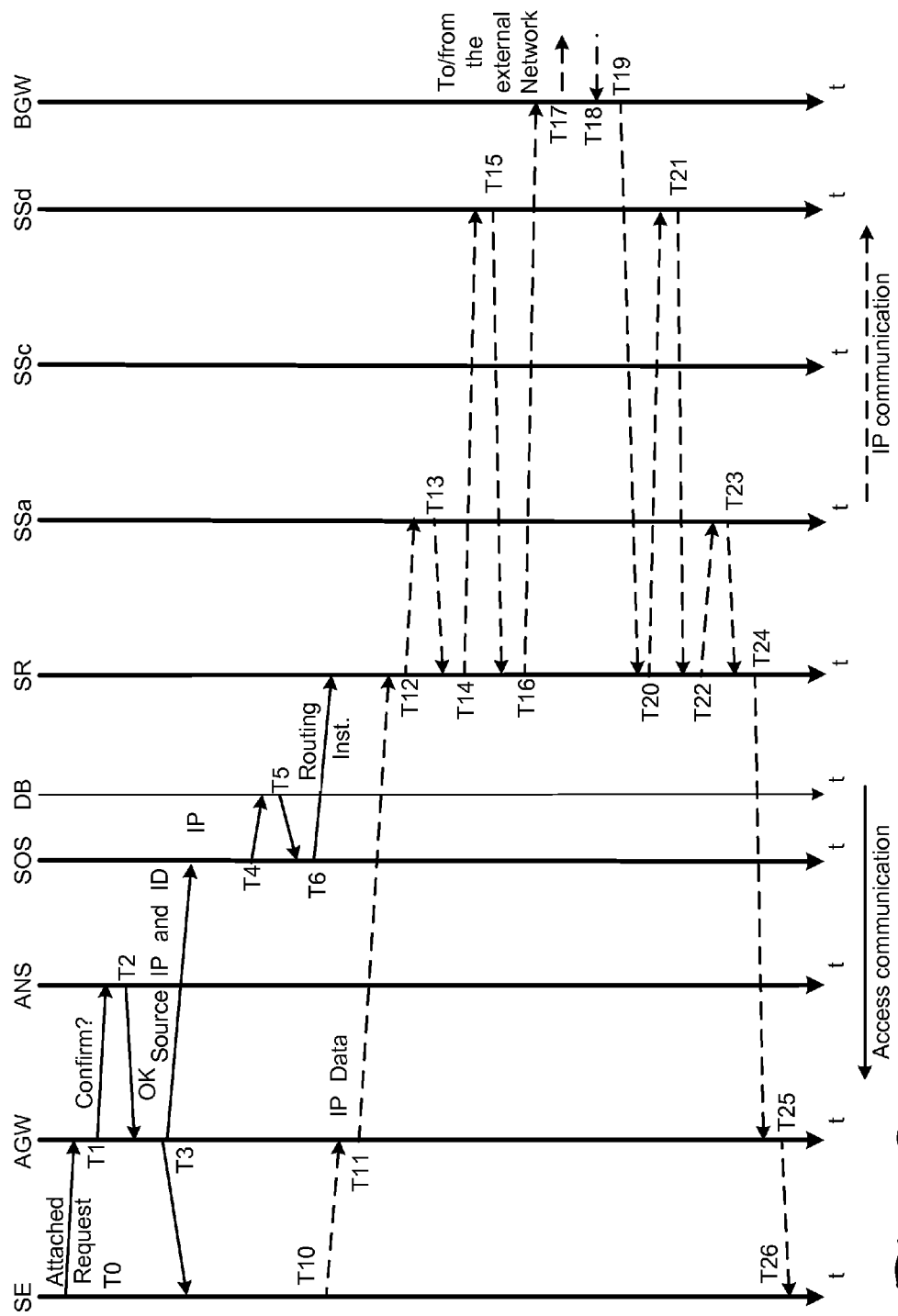
FIG. 3 is an exemplary timing diagram illustrating an exemplary communication flow via system 100 (FIG. 1) according to teaching of the present disclosure.

FIG. 3 is a timing diagram illustrating an exemplary communication flow that can occur in system 100 (FIG. 1) according to the teaching of the present disclosure. Although the exemplary timing diagram refers to a GSM cellular network, it will be appreciated that a person skilled in the art will not limit the scope of the disclosure to a GSM cellular network. Rather, the timing diagram is used to illustrate one possible configuration and does not preclude different configuration for different types of networks. Furthermore, the timing diagram is not drawn to scale and thus, is not intended to show absolute time durations between the various events. At T0, a subscriber 110 (FIG. 1) request to be attached to the Internet 180 (FIG. 1) by sending an attach request. The attach request is received at the AGW 131 (FIG. 1), for example. The attach request can be based on the packet data protocol (PDP), for example. The attach request can include the subscriber ID (such as an International Mobile Subscriber Identity (IMSI) or a Mobile Station International Subscriber Directory Number (MSISDN), or alternate or additional information as well for example.

At T1, the Access Gateway (AGW) 131 can then check with the ANOP management server (ANS) 136 (FIG. 1) to determine if the subscriber and/or the SE is entitled to attach to the Internet. The AGW 131 and the ANS 136 can communicate between each other via a LAN or other means in the ANOP using any of a variety of protocols, such as the Radius protocol, for example. The ANS 136 can include an AAA server, an HLR server, and/or a PCRF server, for example. If the subscriber is entitled to access the Internet, at time T2 the ANS 136 can return an OK-to-attach message to the AGW 131. At time T3 the AGW 131 can then allocate a public IP address to be used by the subscriber and/or SE 110 for accessing the Internet 180. The allocated address is sent to the requesting SE 110 as approving of the request to attach the to data packet network. At time T3 the SOS 150 (FIG. 1) can be informed that the subscriber, having the relevant ID number, has received access to the Internet by using the allocated public IP address. The allocated public IP address can be an available public IP address taken from a pool of IP addresses used by the ANO. In some ANOPs, the GGSN section of the AGW 131 can allocate the public IP address. In some embodiment a private IP address can be allocated instead of public IP address. The private IP address can be replaced by a public IP address, by BGW 160 when the packet leaves the ANOP to the Internet.

Next at time T4 the SOS 150 can search the databases 134 (FIG. 1) for an entry that is associated with the subscriber's ID (or other information used as an access key), for example. The entry is fetched and parsed to determine the latest access services associated with the subscriber or SE 110. The databases 134 can also include real-time policies or, the real-time policies or information can be injected or included when the information is fetched. The policies can lead to dynamically changes according to communication loads, time-of-day, day-of-the-week, month, location of the subscriber, etc. Once the SOS 150 receives the information from the databases 134 and/or ANS 136 at time T5, then the SOS 150 can plan the routing path that the data packets to and from the subscriber need to pass. The SOS 150 can then send at time T6 the planed routing path associated with the allocated public IP address to the SR 140 (FIG. 1). The routing path can include instructions regarding which services to pass the traffic through on its way to and/or from that subscriber. The routing path can be saved in a routing table in the SR 140 in an entry associated to the subscriber allocated public IP address, for example.

At time T10 the first IP data packet is sent from the subscriber toward the AGW 131 (FIG. 1). The AGW 131 can then at time T11 transfer the IP data packet to the SR 140. The smart router, based at least in part on the allocated IP address (or other additional or alternative information) and the routing plan stored in the routing table, can start at time T12 a loop in which the subscriber IP data packet passes through all the services that are required or desired. In cases in which the SR 140 does not have a routing plan for a certain public IP address, then the SR 140 can route the packet via a default routing path which was configured by the ANO, for example. An exemplary routing path can be: SR 140 passes at time T12 the IP data packet through port A of the SR 140 to service server A (SSa) 170a (FIG. 1). Service server A processes the IP data packet and returns at time T13 the processed IP data packet to SR 140. Next the SR 140, according to the routing plan, transfers at time T14 the IP data packet through port D of the SR 140 to service server D (SSd) 170d (FIG. 1). Service server D modifies the IP data packet and returns at time T15 the modified IP data packet to the SR 140. This loop or process may also include more services. At time T16 the modified IP data packet is transferred out of the SR 140 toward the BGW 160 (FIG. 1) and at time T17 the modified IP data packet is transferred toward an external network via BGW 160.

At time T18 an IP data packet can be received from the external network directed toward the subscriber through the BGW 160, for example. At time T19 the BGW 160 can transfer the received IP data packet to the smart router 140. At time T20 the SR 140 can start an internal loop for the received IP data packet, based at least in part on the IP destination number and/or other information. The SR 140 can fetch the routing plan for the public IP address included as the IP destination address of the data packet. The internal loop can be through the same service servers as the IP data packet sent from the subscriber, but in a different order (as demonstrated in the drawing). In some cases a packet from the Internet targeted to a SE 110 (FIG. 1) may have other services than the packets that come from the SE 110 toward the Internet. The routing path, between the access services, for both ways to and from the UE 110 can be set by SRC 240 (FIG. 2) which the UE attached to the access network. At time T20 the SR 140 can pass the received IP data packet through port Pd service server D 170d (FIG. 1). At time T21 the modified received IP data packet is returned to the SR 140. At time T22 the SR 140 passes the received IP data packet through port Pa service server A 170a (FIG. 1). At time T23 the modified received IP data packet is returned to the SR 140. This loop can include more services. At time T24 the SR 140 can output the modified received IP data packet toward the AGW 131. And at time T25 the AGW 131 can output the modified received IP data packet toward the subscriber via the AGW 131. In some embodiments, the internal loop for the packets targeted toward the SE 110 can be through different service servers than the packets transmitted from the SE 110.

The process can be continued until the subscriber request to detach from the data network by sending a detach request (not shown in the drawing) to the AGW 131. The AGW 131 can inform the SOS 150 that there is a detach event from the subscriber with subscriber ID and the used public IP address. The SOS 150 can update the SR 140 with an instruction to delete from the routing table the entry associated with that IP number or additional or alternative information. For instance, a combination of a user ID and an IP number. In some embodiments the SR 140 may use a timeout mechanism that deletes or modifies an entry in the routing table that was not active for a predefine period of time.

Figure 4:
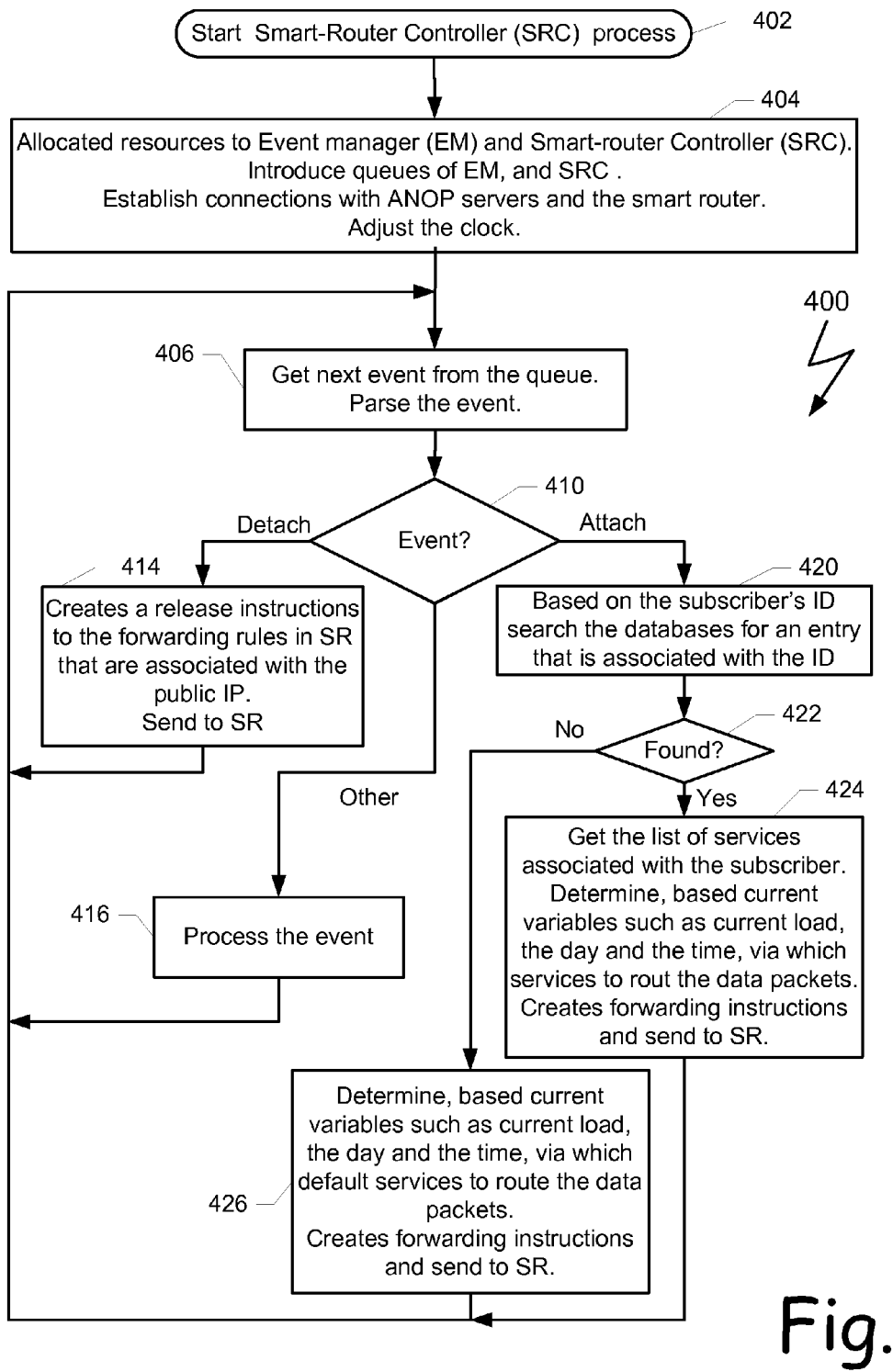
FIG. 4 illustrates a flowchart with relevant steps of an exemplary process for preparing routing instructions according to teaching of the present disclosure.

FIG. 4 is a flowchart diagram 400 illustrating relevant actions of an exemplary process implemented by an exemplary SRC 240. Initially 404, the process 400 can allocate relevant resources such as queues; introduce different modules/units to each other; establish connections between the SOS 200 (FIG. 2) and the relevant servers in ANOP (FIG. 1), and with the SR 140 (FIG. 1). In some exemplary embodiments, these initial actions 404 can be executed by the SOSM 260 instead of the SRC 240.

After the initial process 404 a loop can be initiated. In the loop, the next event from the SRC queue can be fetched and parsed 406. Next, the type of event can be determined 410, such as whether the event is an attach request, detach request, or other. If it is determined that the event is an attach request 410, then based on the subscriber ID the databases 134 (FIG. 1) is searched 420 for relevant information and policies associated with the subscriber. The subscriber ID can be an IMSI or MSISDN, for example, or additional or alternative information can be used as a key to the database 134. Accessing the database 134 can be done via the NIA 210 (FIG. 2), for example. If information on that subscriber exists 422, then a list of services that the subscriber is entitled to utilize or access, the policies, and real-time information on that subscriber is fetched 424. The process 400 then determines 424 according to the information received together with real time data, which services the subscriber will receive. The real-time information can include: the load on the communication lines, the time-of-day, the subscriber or SE location, etc. Based at least in part on this information, a routing path is planed 424 for the subscribers' data packets. The routing plan may be associated with an allocated public IP address that is embedded within the received attach event. The routing path with the allocated public IP address can be translated 424 to comply with the API used by the SR 140 (FIG. 1) and then be sent 424 toward the SR 140 (FIG. 1) via the NISR 250 (FIG. 2). Next the process 400 returns to action block 406.

Returning to the decision process 422, if no information is found on that subscriber, then the process 400 can determine 426 through which default services to pass the subscribers' packets. The process 400 can determine and plan 426 the routing path according to real-time information such as: the time-of-day, the load on the communication lines, etc. For example: if the request is an Email message, then process 400 can determine to pass the subscribers' packets through a Spam filter server. If the request is a web site, then process 400 can determine to pass the subscriber's packets through parental control, and so on. The routing path can be translated 426 to an API and sent 426 together with the allocated public IP address to the SR 140 (FIG. 1) via the NISR 250. Next the process 400 returns to action block 406. The routing plan can include a port number that defines the application that is involved with the data packets. For example, port 80 can indicate on HTTP application, port 25 can indicate an email, etc.

Returning now to the decision block 410 if the event is a detach event, then a release instruction is created, in the API format, 414 together with the allocated public IP address. The release instruction can then be sent to the SR 140 (FIG. 1) via the NISR 250 (FIG. 2) and process 400 can return to action block 406.

If 410 the event is not an attach or a detach request, the SOS 150 can parse 416 the event. If the event is related to the SR 140, then the routing plan is updated and transferred to the SR 140. If it is not related to the SR 140, then the event can be ignored.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit", "element" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A method that allocates access services for a subscriber requesting to attach to an Internet Protocol (IP) network, the method comprising the actions of:
   obtaining identification information of a requesting subscriber that sent a request to attach to an IP network and a currently assigned IP address which was assigned to the requesting subscriber to be used during the current access session over the IP network;
   identifying, based at least in part on the identification information, two or more different access services associated with the identification information;
   creating a routing path toward an external IP network that includes two or more different access service servers in which data traffic associated with the subscriber is passed through in a certain order for providing the identified two or more of access services, wherein the certain order in the routing path defines routing received packets toward a first access service server from the two or more different access service servers, waiting for receiving a relevant processed packet from the first access service server and transfer the received relevant processed packet toward a second access service server from the two or more different access service servers; and
   associating the routing path with the currently assigned IP address.

2. The method of claim 1, further comprising the action of transferring the routing path and the assigned IP address into a smart router.

3. The method of claim 1, wherein the action of obtaining an IP address which was assigned to the requesting subscriber further comprising obtaining a port number.

4. The method of claim 1, wherein the action of obtaining an IP address which was assigned to the requesting subscriber further comprising obtaining a public IP address.

5. The method of claim 1, further comprising the action of routing received packets that include the assigned IP address through the two or more of access service servers included in the routing path.

6. The method of claim 1 wherein the action of identifying the two or more access services further comprises receiving real-time information and including the real-time information in the identification action.

7. The method of claim 6, wherein real-time information comprises the time-of-day and the action of identifying access services further comprises identifying access services that are applicable for the received time-of-day.

8. The method of claim 1, wherein the identification information comprises an International Mobile Subscriber Identity for a subscriber and the action of identifying access services further comprises identifying access services that are associated, at least in part, with that particular International Mobile Subscriber Identity.

9. A method that transfers toward an external Internet Protocol (IP) network via a smart router data traffic of a subscriber through two or more different access services that are available to the subscriber, the method comprising actions of:
obtaining, at the smart router, a routing plan toward an external IP network, wherein the routing plan is associated with a currently assigned IP address, wherein the routing plan defines two or more different access service servers; and
routing toward the external IP network, by the smart router, packets that include the currently assigned IP address through a first access services server from the two or more different access services servers; waiting for receiving, at the smart router, a relevant processed packet from the first access services server and transfer, by the smart router, the received relevant processed packet toward a second access services server from the two or more different access services servers;
wherein the currently assigned IP address was assigned to the subscriber while the subscriber request to attach to the external IP network.

10. The method of claim 9, wherein the action of obtaining a routing plan further comprising obtaining a routing plan wherein the assigned IP address is a public IP address.

11. The method of claim 9, wherein the routing plan depends on real-time information and further comprising the action of receiving real-time information.

12. The method of claim 11, wherein real-time information comprises one or more information elements including a location of subscriber equipment associated with the data traffic, the time-of-day, the day-of-the-week and the identification of a subscriber utilizing the subscriber equipment.

\* \* \* \* \*